No. 832,063. PATENTED OCT. 2, 1906.
G. J. KAPLAN.
COMBINED CHURN AND BUTTER WORKER.
APPLICATION FILED FEB. 9, 1906.
2 SHEETS—SHEET 1.
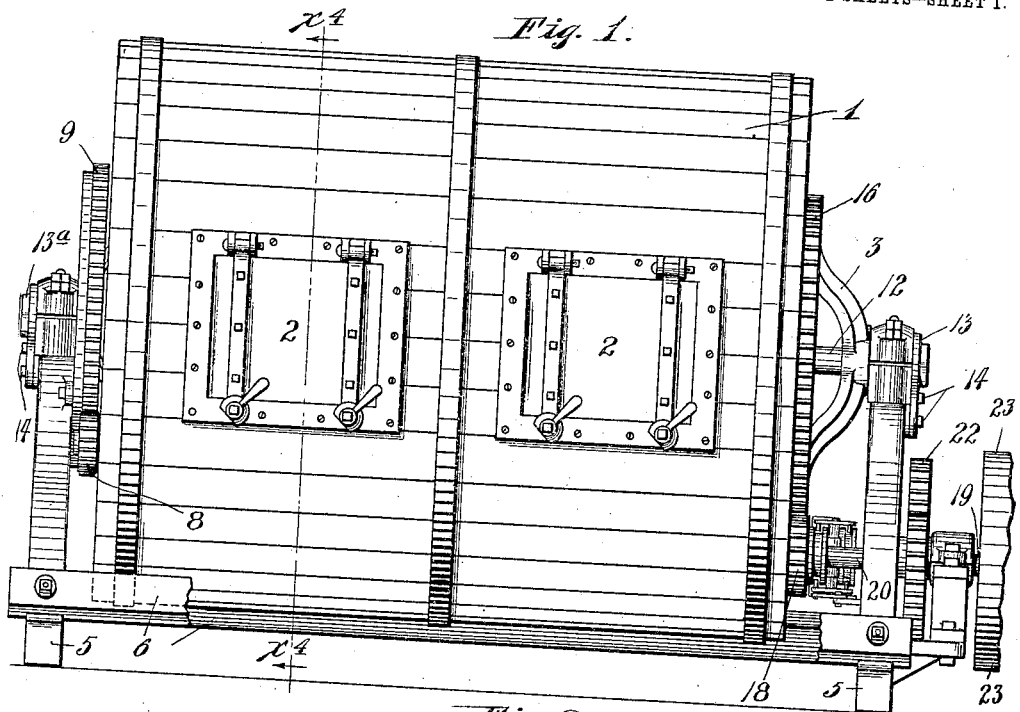
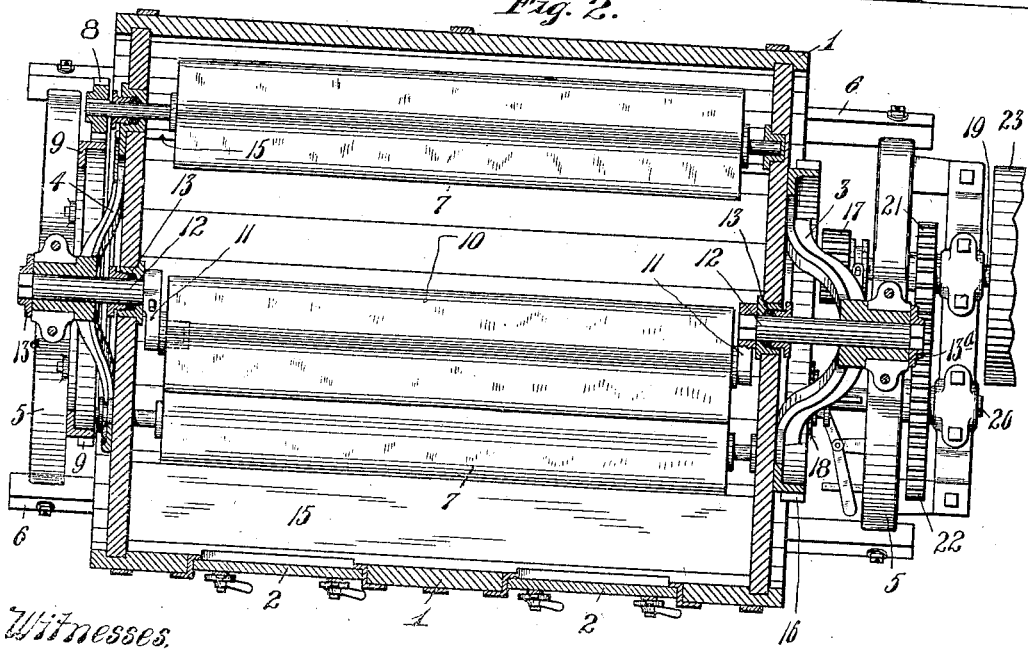
Witnesses.
E. W. Jeppesen.
Mali Hoel.
Inventor.
Godfrey J. Kaplan.
By his Attorneys.
Williamson & Merchant No. 832,063. PATENTED OCT. 2, 1906.
G. J. KAPLAN.
COMBINED CHURN AND BUTTER WORKER.
APPLICATION FILED FEB. 9, 1906.

2 SHEETS—SHEET 2.

Witnesses.
E. W. Jeppesen.
Malie Hoel.

Inventor.
Godfrey J. Kaplan.
By his Attorneys.
Williamson Michards

UNITED STATES PATENT OFFICE.

GODFREY J. KAPLAN, OF OWATONNA, MINNESOTA, ASSIGNOR OF ONE-HALF TO LUTHERIA DISBROW, OF OWATONNA, MINNESOTA, AND ONE-HALF TO REUBEN B. DISBROW, OF MINNEAPOLIS, MINNESOTA.

COMBINED CHURN AND BUTTER-WORKER.

No. 832,063.      Specification of Letters Patent.      Patented Oct. 2, 1906.

Application filed February 9, 1906. Serial No. 300,237.

*To all whom it may concern:*

Be it known that I, GODFREY J. KAPLAN, a citizen of the United States, residing at Owatonna, in the county of Steele and State of Minnesota, have invented certain new and useful Improvements in a Combined Churn and Butter-Worker; and I do hereby declare the following to be a full, clear, and exact description of the invention, such as will enable others skilled in the art to which it appertains to make and use the same.

My invention relates to combined churns and butter-workers, and has for its object to improve the same in point of efficiency and simplicity of construction; and to such ends the invention consists of the novel devices and combinations of devices hereinafter described, and defined in the claims.

The improved machine is illustrated in the accompanying drawings, wherein like characters indicate like parts throughout the several views.

Figure 3:
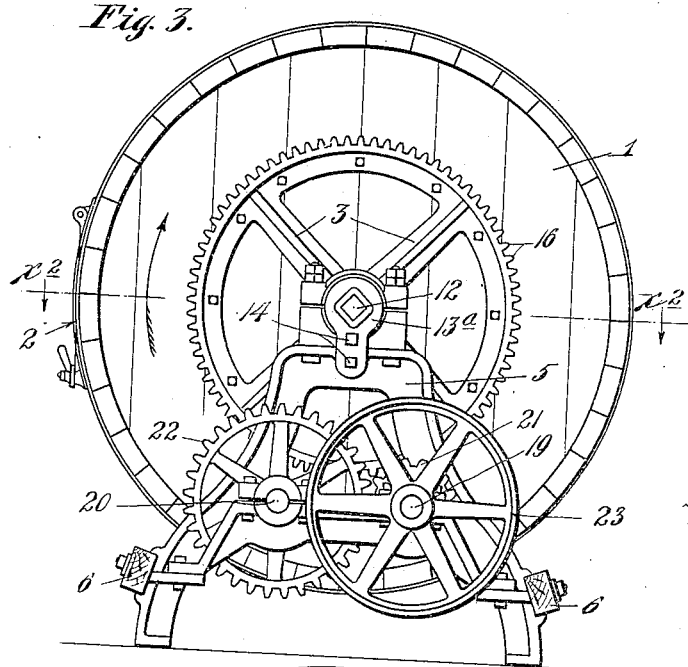
Figure 5:
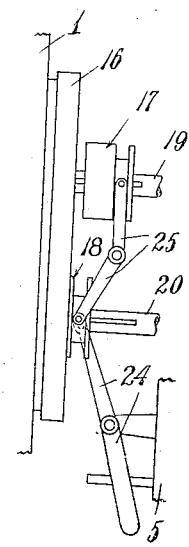
Figure 4:
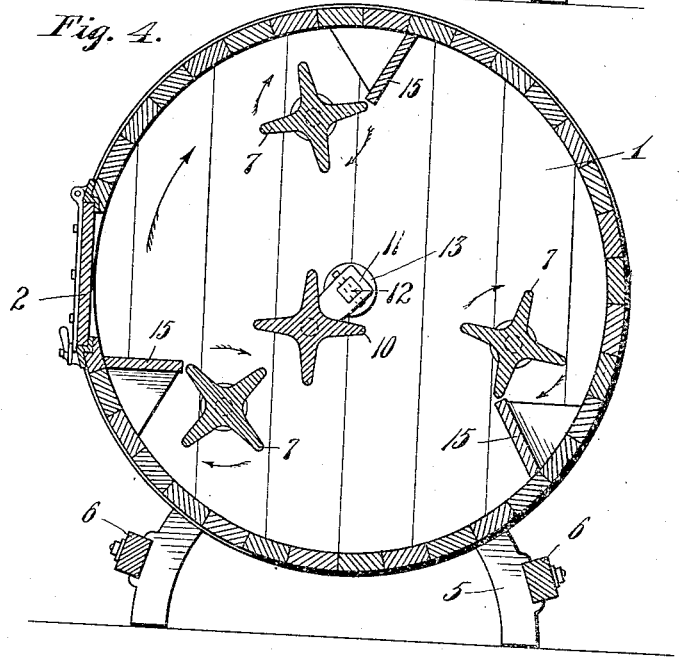

Referring to the drawings, Figure 1 is a view in side elevation, with some parts broken away, showing the improved machine. Fig. 2 is a horizontal section taken through the machine approximately on the line $x^2\ x^2$ of Fig. 3. Fig. 3 is an end elevation of the improved machine. Fig. 4 is a transverse vertical section taken on the line $x^4\ x^4$ of Fig. 1; and Fig. 5 is a diagrammatic plan view of the levers for shifting the gear mechanism from high to low speed, and vice versa.

The rotary drum 1 of the churn is horizontally disposed and is provided with fixed heads and with the usual doors 2 in its peripheral portion. Rigidly secured to the heads of the drum, exterior thereof, are spider-brackets 3 and 4, which, as shown, are provided with hollow trunnions that are journaled in bearing-brackets 5, that rest upon the floor or other support and are preferably tied together by bars 6.

Mounted in suitable bearings in the heads of the drum is a series of deeply-corrugated rollers 7, of which, as shown, there are three. These rollers 7 extend parallel to the axis of the drum and are spaced equidistant circumferentially of the drum and are disposed so that they work near, but some little distance from, the inner surface of the drum. The shafts of these rollers 7 at one end—to wit, at their left-hand ends—as shown in Figs. 1 and 2, project through the adjacent head of the drum and are preferably provided with spur-pinions 8, that mesh with a large non-rotary spur-gear 9, that is rigidly secured to the left-hand frame-bracket 4, so that when the drum is rotated in the direction of the arrow marked thereon in Figs. 3 and 4 the said rollers will be rotated in the direction of the arrows marked thereon in the same views, by reference to which it will be seen that said drum and rollers rotate in the same direction and that the rollers travel with the drum.

For coöperation with the rollers 7 I provide a local idle roller 10, that is located in a position eccentric to the axis of the drum on the rising side of the drum, below the axis thereof. This idle roller 10 of course extends parallel to the rollers 7 and to the axis of the drum and is positioned a proper distance from the line of travel of the rollers 7 to permit the butter to be worked between the same in the butter-working action. At its ends the idle roller 10 is loosely journaled in the depending ends of bearing-arms 11, that are rigidly secured to the inner ends of short shafts 12, which shafts are located concentric to the axis of the drum and extend outward through stuffing-boxes 13 in the heads of the drum and through the hollow trunnions of the spider-brackets 3 and 4. The shafts 12, and hence the bearing-arms 11, are held stationary or against rotation with respect to the drum, as shown, by means of arms 13$^a$, having angular engagement with outer ends of said shafts 12 and secured to the respective frame-brackets 4 and 5 by means of set-screws 14 or other suitable devices.

For coöperation with each of the rollers 7 there is rigidly secured within the drum a lifting and guiding shelf 15. These shelves 15 extend inward from the inner surface of the drum and at their inner edges terminate at or approximately at the line of travel of the extreme outer portions of the coöperating corrugated rollers 7, so that no butter can drop down between a shelf and its coöperating roller, as they act upon the butter on the rising side of the drum.

As is well known, a relatively high speed is required for churning and a relatively slow speed for working the butter. I provide for these variable speeds, preferably, by the following devices: An annular spur-gear 16 is, as shown, cast integral with the base-flange of the spider-bracket 3. This gear 16 is adapted to be engaged by either of two spur-pinions 17 and 18, which pinions are made to rotate with, but are free to slide upon, counter-shafts 19 and 20, respectively, which shafts are journaled in suitable bearings on the right-hand frame-bracket 5. The shaft 19 carries a spur-pinion 21, that meshes with a relatively large spur-gear 22 on the shaft 20, so that the shaft 20 will rotate at a relatively slow speed with respect to the shaft 19. On the outer end of the shaft 19 is a pulley 23, over which a power-driven belt (not shown) will run to impart motion to the drum through one or the other of the pinions 17 and 18.

As is evident, when the spur-pinion 17 is in mesh with the gear 16 and the pinion 18 is out of mesh therewith, the drum will be driven at a relatively high speed, as required for churning, and, on the other hand, when the pinion 18 is in mesh with said gear 16 and the pinion 17 is out of mesh therewith said drum will be driven at a relatively slow speed, as required for the butter-working action. As a simple device for moving the pinions 17 and 18 alternately into and out of mesh with the gear 16 I provide a pair of shipper-levers 24 and 25, that are pivoted at their intermediate portions to suitable bearings on the right-hand frame-bracket 5. The lever 24 is provided at its outer end with a handpiece, and the inner end thereof engages a groove in the hub of the pinion 18. The shipper-lever 25 at one end engages the groove in the hub of the pinion 18 and at its other end engages a groove in the hub of the pinion 17.

With the driving mechanism for the traveling rollers 7, as shown and above described, the said rollers will be rotated on their own axes and will be caused to revolve around the axis of the drum both in the churning and the butter-working actions. In the churning action both the shelves 15 and the rollers 7 will act upon the cream under the rotation of the drum, and the cream will be subjected thereby in succession to various concussions and agitations which are conducive to rapid churning.

In the butter-working action the shelves 15 as they pass from the lowest point and upward on the rising side of the drum will lift the butter. Each shelf 15 as it rises approximately to or past a horizontal position, or with a large body of butter before it has reached such position, will direct the butter onto the coöperating adjacent roller 7, and the butter thus delivered will be forced to pass between said rollers 7 and the idle local roller 10, partly by the action of gravity and partly by the action of the positively-driven roller 7. The deep corrugations of the rollers 7 and 10 form the said rollers with long radially-projecting ribs or flanges which act upon the butter, force between the rollers, and serve to cut the same into sections as well as to press the butter, so that under the action of the several traveling rollers 7 in succession the butter will be thoroughly worked and the salt will be thoroughly and evenly commingled with all portions thereof. It is of course evident that when the body of butter is forced between any one of the rollers 7 and the roller 10 both of said rollers will be caused to rotate. Hence, with the rollers 7 positively driven it is not only unnecessary, but undesirable, to positively rotate the roller 10 by means of a driving-gear.

What I claim is—

1. The combination with a revoluble drum, of a corrugated idle roller journaled in bearings that maintain the same eccentric to the axis of the drum, on the rising side thereof, and a corrugated traveling roller mounted in and carried by said drum and arranged to travel around said idle roller and to coöperate therewith, to work the butter on the rising side of the drum.

2. The combination with a revoluble drum, of a corrugated idle roller journaled in bearings that support the same eccentric to the axis of the drum, on the rising side thereof, and a plurality of corrugated traveling rollers journaled to the heads of said drum and arranged to travel around said idle roller and to coöperate therewith, in succession, to work the butter on the rising side of the drum.

3. The combination with a revoluble drum, of a corrugated idle roller journaled in bearings that maintain the same, eccentric to the axis of the drum on the rising side thereof, a plurality of corrugated traveling rollers journaled in the heads of said drum, provided with trunnions at one that project through the adjacent head of the drum, said traveling rollers being arranged to coöperate, in succession, with said idle roller to work the butter on the rising side of the drum, pinions on the projecting trunnions of said traveling rollers, and a fixed gear with which said pinions mesh, to positively rotate said traveling rollers under the rotation of the drum, substantially as described.

4. The combination with a revoluble drum provided within with a deeply-corrugated roller located near the inner surface thereof, and a single shelf coöperating with said roller, said shelf extending from the inner surface of said drum and terminating at its inner edge close to the line of rotation of the extreme outer portions of said corrugated roller, and arranged to deliver the butter onto said roller, on the rising side of the drum, substantially as described.

5. The combination with a revoluble drum provided within with a plurality of deeply-corrugated rollers located therein near the inner surface thereof, and a single shelf cooperating with each roller and extending from the inner surface of said drum and terminating at its inner edge close to the line of rotation of the extreme outer portions of the respective corrugated rollers and arranged to deliver the butter onto the respective rollers in succession and on the rising side of the drum, substantially as described.

6. The combination with a revoluble drum, of a corrugated idle roller journaled in bearings that maintain the same, eccentric to the axis of the drum on the rising side thereof, a plurality of corrugated traveling rollers mounted in and carried by said drum and arranged to travel around said idle roller and to coöperate therewith to work the butter on the rising side of the drum, and a lifting-shelf coöperating with each traveling roller, said shelves extending from the inner surface of the drum and terminating at their inner edges close to the line of rotation of the extreme outer portions of the corresponding corrugated traveling rollers, substantially as described.

In testimony whereof I affix my signature in presence of two witnesses.

GODFREY J. KAPLAN.

Witnesses:
  F. A. DUNHAM,
  L. A. DISBROW.